United States Patent Office 3,292,739
Patented Dec. 20, 1966

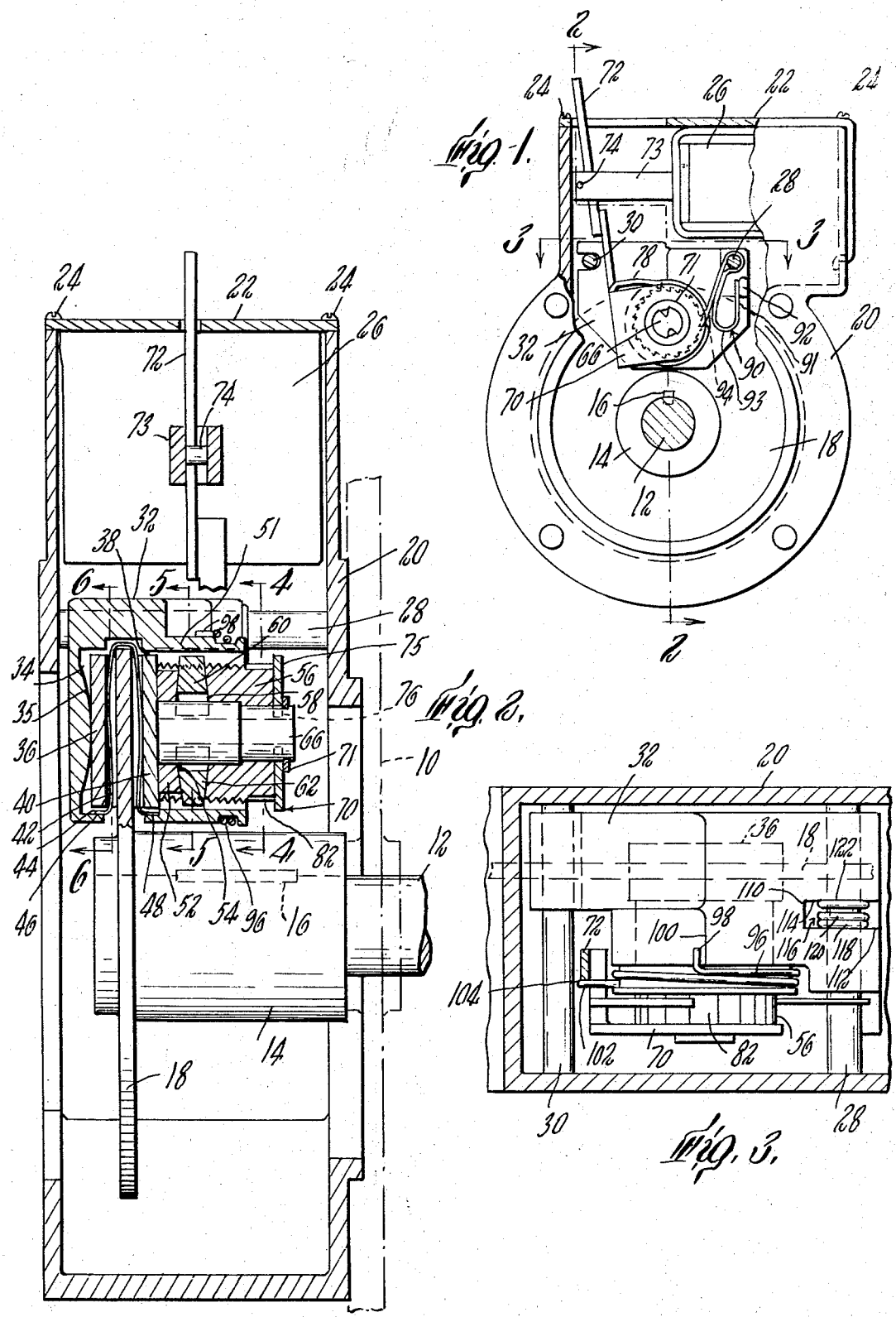

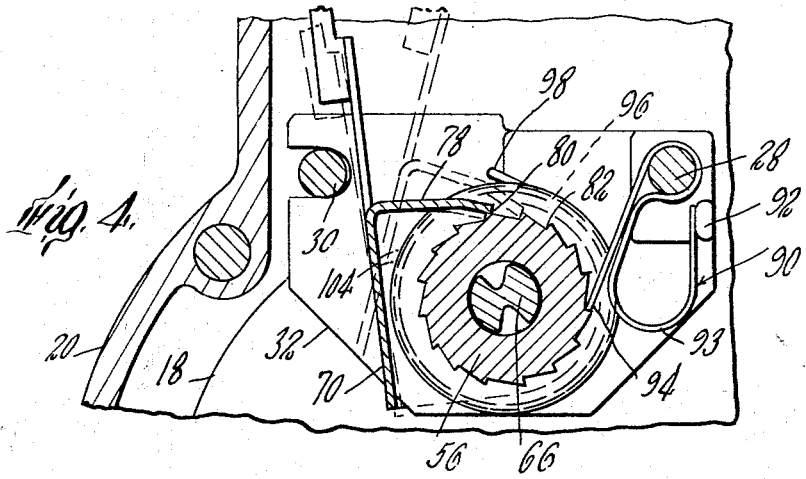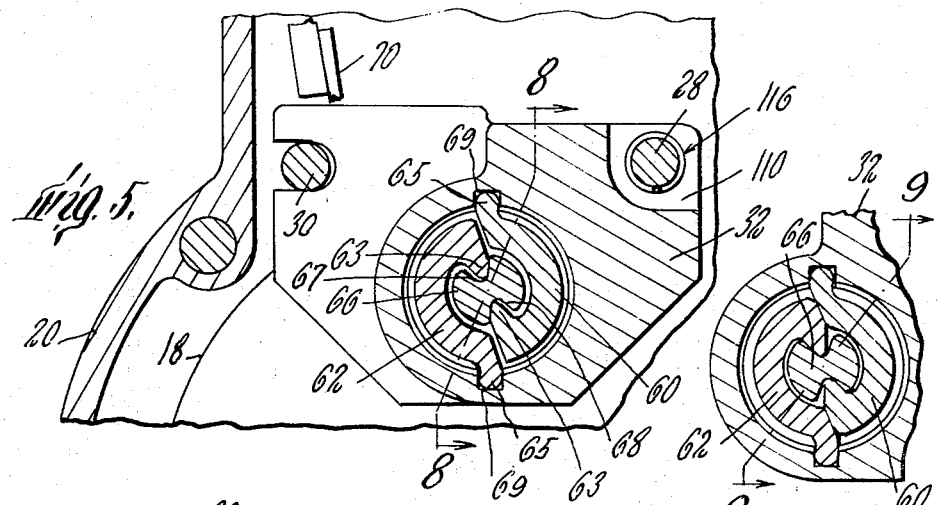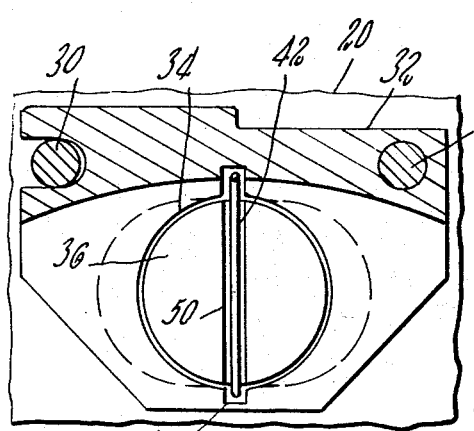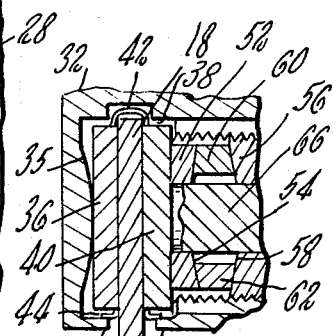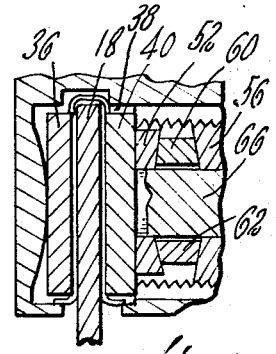

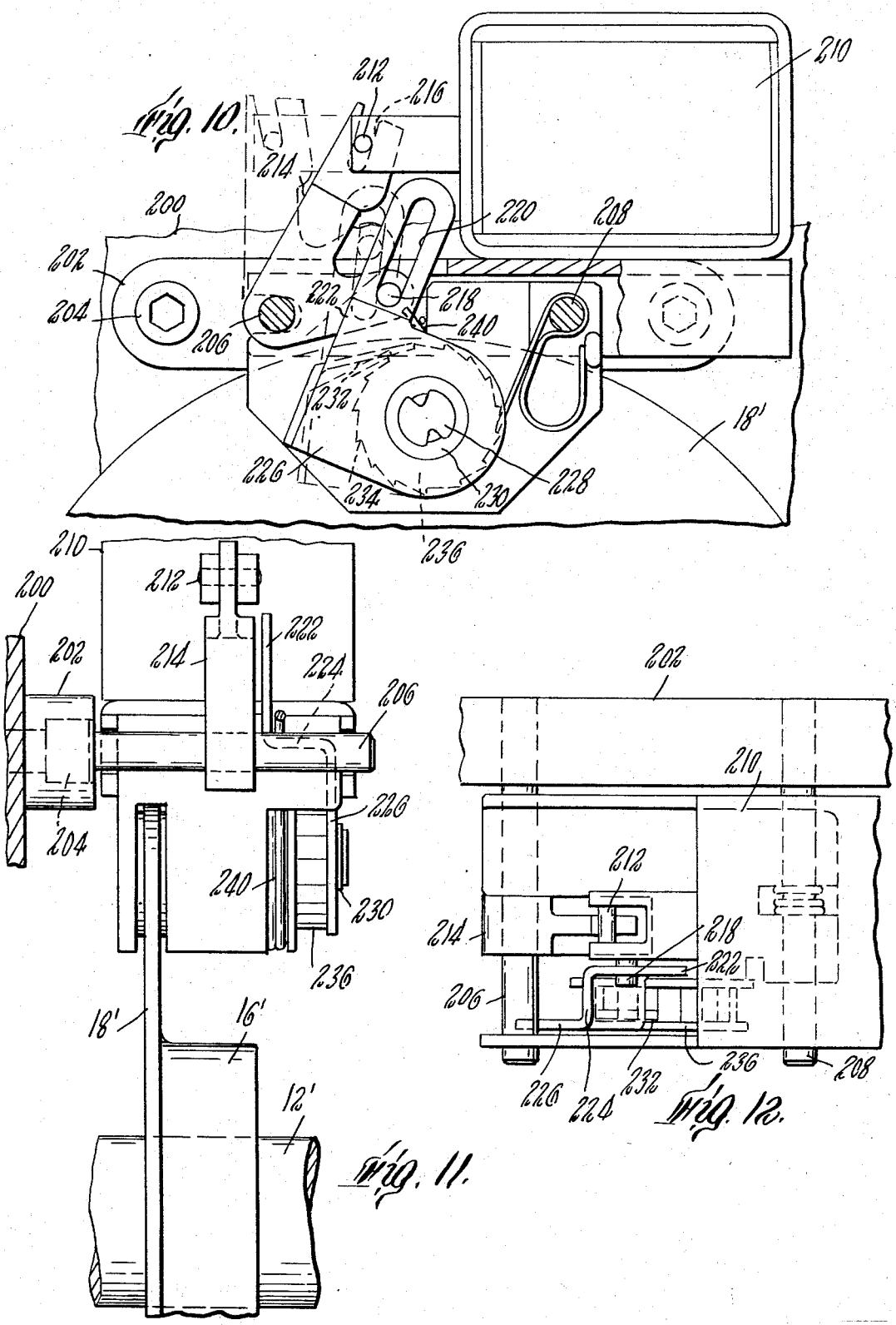

3,292,739
SPOT BRAKE ACTUATOR AND
POSITIONING MEANS
Otmar M. Ulbing, R.F.D. 1, Berkshire, N.Y. 10001
Filed Sept. 24, 1964, Ser. No. 398,986
6 Claims. (Cl. 188—73)

This invention relates to coupling devices and more particularly to couplings of the disc brake type in which a pair of friction elements are adapted to be forced into engagement with opposite faces of a rotating disc.

Disc brakes of the above type have been found to have advantages in a variety of applications. Such brakes normally have better cooling characteristics than the drum type of brake because the surface area of friction material in contact with the cooperating braking surface is considerably reduced. However, because of this reduced area of friction material, the rate of wear of that material is somewhat accelerated. It is, therefore, desirable to incorporate an automatic adjusting mechanism to maintain the clearance between the braking surfaces within proper operating limits throughout the life of the friction material.

Accordingly, it is an object of this invention to provide a novel and improved coupling device of the disc brake type.

Another object of the invention is to provide a novel and improved actuating mechanism for a coupling device of a disc brake type.

Still another object of the invention is to provide novel and improved automatic wear compensation mechanisms suitable for use in coupling devices of the disc brake type.

Still another object of the invention is to provide automatic wear compensation mechanism in a single disc spot type brake which is positive in action, is rugged, and is relatively inexpensive to manufacture.

Another object of the invention is to provide an automatic wear adjustment mechanism for a disc brake which maintains the clearance between the braking surfaces within predetermined limits over the life of the friction material.

Still another object of the invention is to provide novel and improved automatic wear compensation mechanism capable of operating over relatively large adjustment ranges.

A further object of the invention is to provide a novel and improved wear compensation mechanism which adjusts the friction elements on the releasing stroke of the brake actuating mechanism.

A disc brake constructed in accordance with the invention includes a caliper structure that has a recess in which the radial surfaces of a disc element are received. This caliper structure is mounted in a manner that permits it to move in a direction parallel to the axis of rotation of the disc. Two friction pad elements are carried by the caliper structure so that they are disposed on opposite sides of the disc. One of the friction pad elements is coupled directly to the caliper structure, while the other friction pad element is movable relative to the caliper structure in the axial direction. Each pad element is connected to an actuator element, and actuating means interposed between the actuator elements effectively applies an axial force to the actuator elements to clamp the friction pad elements onto the disc in a braking operation. The actuating means, in the preferred embodiments, includes camming elements which, in response to rotation of a brake control, are moved in a radial direction and act against the actuator elements.

A wear adjusting mechanism incorporated in the brake operates to sense the degree of angular rotation necessary to apply a predetermined amount of braking force and whenever that degree of angular rotation is exceeded, the wear compensation mechanism automatically adjusts the spacing of the friction pad elements on the releasing stroke of the actuating means so that the clearance between those pad elements is maintained within predetermined limits over the life of the friction material. A further feature of the brake structure is the provision of means to limit the axial motion of the caliper structure, which motion limiting means are displaced in conjunction with the wear compensation operation. This brake is a rugged component easy to operate and reliable in operation. The mechanical structure of the invention may be incorporated in a variety of coupling devices.

Other objects, features and advantages of the invention will be seen as the following description of preferred embodiments thereof progresses, in conjunction with the drawings, in which:

FIG. 1 is a side elevational view, with parts broken away, of a motor brake constructed in accordance with the invention;

FIGS. 2 and 3 are sectional views of the motor brake shown in FIG. 1 taken along the lines 2—2 and 3—3 of FIG. 1, respectively;

FIGS. 4, 5, and 6 are sectional views taken along the lines 4—4, 5—5, and 6—6, respectively, of FIG. 2 showing additional details of components of the motor brake;

FIG. 7 is a sectional view similar to FIG. 5 showing the brake in released condition;

FIG. 8 is a sectional view taken along the line 8—8 of FIG. 5 indicating the position of components when the brake is in holding condition;

FIG. 9 is a sectional view taken along the line 9—9 of FIG. 7;

FIG. 10 is a side elevational view, with parts broken away, of an open brake design constructed in accordance with the principles of the invention;

FIG. 11 is an elevational view of the open disc brake shown in FIG. 10; and

FIG. 12 is a top view of the open disc motor brake construction shown in FIGS. 10 and 11.

With reference to FIGS. 1–3, the motor brake unit thereshown is mounted on the frame 10 of a motor, which frame has an aperture through which the motor shaft 12 extends. Mounted on the end of the motor shaft 12 is a hub 14 secured by key 16, which hub has a disc 18 welded on it.

The hub and disc are positioned within a brake housing 20 which is secured to the frame 10 of the motor. The brake housing has a cover 22 which is secured by screws 24 and encloses a chamber in the upper portion of casing 20 in which a solenoid actuator 26 is housed. Also supported within the brake housing are two rods or rails 28, 30 which are secured between the opposed walls of the housing and extend parallel to the axis of rotation of motor shaft 12.

Mounted for sliding movement along the rails 28, 30 is a caliper brake unit 32. This caliper brake unit has a recess into which the edge of disc 18 extends. A pocket 34 formed in one side of the recess has a spherical wall 35 and receives a friction pad 36. On the opposite side of the recess a similar pocket 38 is formed in which a second friction pad 40 of similar configuration is housed. As indicated best in FIG. 6, these friction pads 36, 40 may be of cylindrical configuration. Other configurations may also be employed, e.g., elliptical, as indicated in dashed lines in FIG. 6. A U-shaped biasing spring 42 having lower projections 44 received on seats 46, 48 is disposed within slots 50 in the faces of pads 36, 40, respectively. This spring 42 acts to move the pads away from the face of the disc 18 when the brake is released.

The caliper unit 32 also includes a boss portion 51 defining an internally threaded, axially extending bore in which is received a disc 52, one surface 54 of which is tapered at a five degree angle, and a threaded member 56 having a correspondingly tapered surface 58. Disposed between surfaces 54, 58 are two camming actuator members 60, 62 of configuration best indicated in FIGS. 2 and 5. Each actuator has an inclined radial surface, a projection 63 that extends radially inwardly and a projection 65 that extends radially outwardly.

An actuator shaft 66 having two axially extending grooves 67, 68 is positioned within the boss 51 and extends through member 56 and supports disc 52 with actuator projections 63 disposed in the grooves 67, 68. The projections 65 are received in axially extending slots 69 in the bore of boss 51.

A brake control member 70 is secured to shaft 66 by retainer ring 71. This actuator member includes upstanding arm 72 that is pinned to solenoid arm 73 by pin 74, and plate portion 75 that has projections 76 which fit in grooves 67, 68 in shaft 66. The actuator member also includes a ratchet driver member 78 having an end portion 80 which engages ratchet teeth 82 carried on the outer surface of member 56. A spring 90, mounted on rod 28, has one end 91 positioned against stop 92 and the loop portion 93 thereof forces the opposite end 94 into latching engagement with a ratchet tooth 82 so that the rotation of member 56 is permitted in only one direction.

The caliper unit also carries a brake spring 96 having a first end 98 abutting vertical surface 100 (FIG. 3) on the caliper member and a second end 102 which extends radially and overlies a surface 104 on the actuator member 70. The spring 96 tends to rotate the actuator member in the counterclockwise direction as viewed in FIG. 1 and to rotate shaft 66 in the brake engaging direction.

With the brake mechanism in the position shown in FIG. 1, the brake is on and the friction pad elements 36, 40 firmly clamp disc 18 so that rotation of shaft 12 relative to brake housing 20 is prevented. When the solenoid 26 is energized, the actuator member 70 is moved in a clockwise direction and rotates shaft 66 from the position shown in FIG. 5 (and in opposition to the biasing force of spring 96) towards the position shown in FIG. 7. This rotation of shaft 66 allows the camming elements 60, 62 to move inwardly, thus reducing the space between the washer 52 and member 56. This motion allows the friction pads 36 and 40 to move away from one another under the influence of spring 42 and free the disc 18 for rotation. It will be noted that each camming member 60, 62, as shaft 66 is rotated, is rocked about a pivot defined by the cooperation of projection 65 and slot 69 in the caliper structure to move their inclined surfaces radially and accomplish the change of spacing of the disc 52 and member 56. As member 56 is threadedly secured to the caliper structure, the motion of member 56 relative to disc 52 is transmitted to the pressure pads 36, 40 for moving them into engagement with disc 18 or releasing them from such engagement. Also, the caliper unit itself has at least limited freedom to move relative to disc 18 as it is slidably mounted on rods 28, 30 so that the recess in the caliper structure tends to remain centered with respect to the disc.

When the brake is to be employed in a position other than horizontal, it is desirable to control the motion of the caliper unit so that gravity will not cause one of the friction pads 36, 40 to engage disc 18. To this end a recess 110 (FIG. 3) in the caliper unit 32 is provided which has two spaced walls 112, 114 and through which support rod 28 passes. Secured on rod 28 within recess 110 is a spring 116 which has two turns 118, 120 closely wound and a third turn 122 spaced from the other turns. Turns 118, 120 are of an inner diameter which frictionally engages rod 28. The spring in released condition is of a length slightly greater than the spacing between walls 112, 114 and, hence, is compressed when in recess 110. When the brake is actuated, spring 116 is compressed further, as the caliper structure is moved to enable pad 36 to engage disc 18. If pad 36 has been worn so that the resilient section 122 of spring 116 is brought up against the axial control section (turns 118, 120), the control section will be moved along rod 28, thus repositioning the caliper unit. Upon release of the brake, the caliper unit is moved to a release position by resilient section 122 of the spring 116.

The brake structure also includes an adjustment mechanism which provides compensation for wear of the friction pads 36, 40. With reference to FIG. 4, the brake spring 96 biases the actuator member 70 in a counterclockwise direction. If the pressure pads are worn, the actuator 70 will be rotated by spring 96 in a counterclockwire direction a sufficient distance for pawl portion 80 of ratchet member 78 to slide over one ratchet tooth 82. On energization of solenoid 26 to release the brake, the pawl 80 will rotate member 56 as the actuator 70 moves in the clockwise direction to reduce the spacing between the disc 52 and member 56 in an automatic wear compensation operation. It will be noted that this adjustment occurs as a direct function of the position of the actuator shaft 66 which in turn is a function of the pressure applied to the disc 18 by pressure pads 36, 40 from spring 96 as coupled by the camming members 60, 62. This compensation adjusts the brake mechanism spacing so that the angular rotation of shaft 66 necessary to apply full braking force remains approximately constant. Again, the freedom of axial movement of the caliper unit also facilitates this compensation.

A second embodiment of the invention in the form of an open disc brake is shown in FIGS. 10–12. This brake is designed for heavier duty operation and applies two hundred foot-pounds of braking force through pressure pads each having two square inches of frictional area. In this embodiment a disc 18' mounted on hub 16' secured to shaft 12' by conventional means is provided. The brake structure is mounted on a suitable support 200 by means of a frame member 202 which is secured on the support 200 by bolts 204. Projecting from the frame member 202, in cantilever fashion, are two rods 206, 208 on which the caliper brake unit is supported. That caliper brake unit includes an actuating solenoid 210 which carries pin 212. A bell crank 214 is mounted for rotation on rod 206. One arm of the bell crank 214 has a slot 216 which receives pin 212 and the other arm carries a pin 218 which is received in slot 220 of actuator member 222. The actuator member has an offset surface portion 224; a plate portion 226 that is received on grooved drive shaft 228 and secured by retaining ring 230; and a pawl member 232 which is adapted to cooperate with ratchet teeth 234 carried on threaded member 236 in similar manner to the previously described embodiment. Brake spring 240 acts to rotate the brake actuator 222 and shaft 228 in the counterclockwise direction to apply the braking force by moving the friction pads towards one another and into engagement with disc 18'.

The brake structure operates in substantially the same manner as the previously described embodiment between a released position (shown in solid lines in FIG. 10) and an engaged or braking position (shown in dotted lines in FIG. 10).

While preferred embodiments of the invention have been shown and described, modifications thereof will be obvious to those skilled in the art. A variety of actuating mechanisms may be used and other obvious combinations of modified components will accomplish the structural results provided by the invention. Therefore, while preferred embodiments have been shown and described, it is not intended that the invention be limited thereto or to details thereof and departures may be made therefrom within the spirit and scope of the invention as defined in the claims.

What is claimed is:

1. A disc brake comprising a disc mounted for rotation about a predetermined axis,
a caliper structure having a recess for receiving a portion of said disc,
means to support a first friction pad on one side of said recess,
means defining a bore extending from the opposite side of said recess parallel to said predetermined axis, said bore having an internally threaded portion and a seat for a second friction pad at the end of said bore adjacent said recess so that said second friction pad is disposed on the opposite side of said disc from said first friction pad,
an externally threaded member secured in said internally threaded portion of said bore,
a tapered camming shoe having two opposed actuator surfaces which mate with surfaces of said second friction pad and said threaded member respectively, at least one of said shoe actuator surfaces being a segment of a conical surface,
a control device for moving said shoe in a radial direction with respect to the axis of said conical surface to increase the spacing between said second pad and said threaded member to cause said first and second friction pads to move towards one another, and
means coupled to said control means for rotating said threaded member in a compensation operation in response to rotation of said control means in excess of a predetermined amount.

2. The brake as claimed in claim 1 wherein said camming shoe is secured for pivoting movement in said bore and said control device includes a shaft extending into said bore for pivoting said camming means in a radial direction.

3. The brake as claimed in claim 1 and further including means to support said caliper structure for sliding movement independently of said disc along an axis parallel to said predetermined axis, said caliper structure including a slot defining two opposed surfaces through which said support means passes,
and means cooperating with said support means for limiting the sliding movement of said caliper structure along said support means,
said movement limiting means being in the form of a coil spring having at least one turn frictionally coupled to said support means and engaging one of said slot surfaces and at least a second turn spaced from said one turn to provide a resilient portion disposed between said one turn and the second surface of said slot.

4. A disc brake comprising a disc mounted for rotation about a predetermined axis,
a caliper structure having a recess for receiving a portion of said disc,
means to support a first friction pad on one side of said recess,
means defining a bore extending from the opposite side of said recess parallel to said predetermined axis, said bore having an internally threaded portion, two axially extending grooves, and a seat for a second friction pad at the end of said bore adjacent said recess so that said second friction pad is disposed on the opposite side of said disc from said first friction pad,
an externally threaded member secured in said internally threaded portion of said bore,
two tapered camming elements secured in said bore between said second pad and said threaded member,
each said camming element having a portion secured in said axially extending grooves for pivoting movement in a radial direction about said grooves to act against and increase the spacing between said second pad and said threaded member for moving said first and second friction pads towards one another,
a control shaft mounted in said bore for rotation about the axis of said bore and engaging said tapered camming elements for moving said camming elements in a radial direction when said shaft is rotated, and
means coupled to said control shaft for rotating said threaded member in a wear compensation operation in response to rotation of said control shaft in excess of a predetermined amount.

5. A caliper structure for use in a disc brake comprising a body member having a recess for receiving a portion of said disc,
a first friction pad supported on said body member on one side of said recess,
a second friction pad supported by said body member on the opposite side of said recess for movement towards and away from said first friction pad, said second friction pad including an actuator surface opposite its braking surface,
a back-up member secured in said body member having an actuator surface, said actuator surface being tapered relative to the actuator surface of said second friction pad,
a tapered camming shoe having two opposed actuator surfaces which mate with the actuator surfaces of said second friction pad and said back-up member respectively, at least one of said shoe actuator surfaces being a segment of a conical surface,
a control device for moving said shoe in a radial direction with respect to the axis of said conical surface to increase the spacing between said second pad and said back-up member to cause said first and second friction pads to move towards one another,
and structure responsive to said control device for moving said back-up member in a compensation operation in response to movement of said control device in excess of a predetermined amount.

6. A disc brake comprising a caliper structure including means to support two friction pads in spaced relation,
a disc mounted for rotation about a predetermined axis having a radial portion disposed between said spaced friction pads,
means to support said caliper structure for sliding movement independently of said disc along an axis parallel to said predetermined axis, said caliper structure including a slot defining two opposed surfaces through which said support means passes,
means cooperating with said support means for limiting the sliding movement of said caliper structure along said support means,
said movement limiting means being in the form of a coil spring having at least one turn frictionally coupled to said support means and engaging one of said slot surfaces and at least a second turn spaced from said one turn to provide a resilient portion disposed between said one turn and the second surface of said slot,
actuating means for moving said friction pads between a first position in which said pads are out of engagement with said disc and a second position in which said friction pads are in frictional engagement with the radial surfaces of said disc, the movement of said pads between said first and second positions producing a movement of said caliper structure along said support means that tends to compress said resilient portion and the excessive movement of said caliper structure along said support means acting through said resilient portion to move said coil spring along said support means to adjust the position of said caliper structure in a compensation operation.

References Cited by the Examiner
UNITED STATES PATENTS

| | | | |
|---|---|---|---|
| 3,110,364 | 11/1963 | Butler | 188—73 |
| 3,155,195 | 11/1964 | Brawerman | 188—73 |
| 3,184,004 | 5/1964 | Butler | 188—196 X |
| 3,199,635 | 8/1965 | Bessler et al. | 188—73 |
| 3,182,754 | 5/1965 | Hahm et al. | 188—73 |
| 3,194,349 | 7/1965 | Kershner et al. | 188—73 |
| 3,228,493 | 1/1966 | Kershner | 188—73 |

FERGUS S. MIDDLETON, *Primary Examiner.*

MILTON BUCHLER, *Examiner.*

G. E. A. HALVOSA, *Assistant Examiner.*